US009458899B2

(12) United States Patent
Rothvoss et al.

(10) Patent No.: US 9,458,899 B2
(45) Date of Patent: Oct. 4, 2016

(54) ACTUATOR ARRANGEMENT FOR A MOTOR VEHICLE DRIVETRAIN, WITH CONTROL METHOD FOR THE SAME

(71) Applicant: GETRAG Getriebe- und Zahnradfabrik Hermann Hagenmeyer GmbH & Cie KG, Untergruppenbach (DE)

(72) Inventors: Stefan Rothvoss, Steinheim (DE); Klaus Eckweiler, Untergruppenbach (DE); Ralf Trutschel, Naumburg (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 14 days.

(21) Appl. No.: 14/273,634

(22) Filed: May 9, 2014

(65) Prior Publication Data
US 2014/0246284 A1    Sep. 4, 2014

Related U.S. Application Data

(63) Continuation of application No. PCT/EP2012/073222, filed on Nov. 21, 2012.

(30) Foreign Application Priority Data

Nov. 22, 2011   (DE) .................. 10 2011 119 631

(51) Int. Cl.
F16D 48/06       (2006.01)
F16D 25/10       (2006.01)
F16D 48/02       (2006.01)

(52) U.S. Cl.
CPC ........... F16D 48/0206 (2013.01); F16D 25/10 (2013.01); *F16D 2048/026* (2013.01);
(Continued)

(58) Field of Classification Search
CPC .................. F16D 48/0206; F16D 2048/026; F16D 2048/0236; F16D 2048/0245; F16D 2048/0278
See application file for complete search history.

(56) References Cited

U.S. PATENT DOCUMENTS 4,611,698 A * 9/1986 Lehmann ............... B60W 30/18
                                                    192/30 W
7,823,473 B2   11/2010 Uberti
(Continued)

FOREIGN PATENT DOCUMENTS

CN     101255920 A    9/2008
CN     201992053 U    9/2011
(Continued)

OTHER PUBLICATIONS

Machine translation of EP 1253341 downloaded from epo.org on Aug. 20, 2015.*
(Continued)

*Primary Examiner* — Richard Lorence
(74) *Attorney, Agent, or Firm* — Reising Ethington P.C.

(57) ABSTRACT

An actuator arrangement for a motor vehicle drivetrain, in particular for a dual-clutch arrangement. A first fluid cylinder is connected via a first fluid connection to a fluid supply device. A second fluid cylinder is connected via a second fluid connection to the fluid supply device. A pressure measuring arrangement has a single pressure sensor which is connected by means of a connecting arrangement to the first fluid connection and to the second fluid connection.

11 Claims, 3 Drawing Sheets

(52) U.S. Cl.
CPC ............... *F16D2048/0236* (2013.01); *F16D 2048/0245* (2013.01); *F16D 2048/0278* (2013.01); *F16D 2300/18* (2013.01); *F16D 2500/70406* (2013.01)

(56) References Cited

U.S. PATENT DOCUMENTS

| | | | |
|---|---|---|---|
| 2008/0190729 A1* | 8/2008 | Stehr | F16D 48/0206 192/48.601 |
| 2012/0085614 A1* | 4/2012 | Martin | F16D 48/0206 192/48.601 |

FOREIGN PATENT DOCUMENTS

| | | |
|---|---|---|
| DE | 10316419 A1 | 11/2003 |
| DE | 102007009542 A1 | 8/2008 |
| EP | 1253341 A2 | 10/2002 |
| EP | 1253341 A3 | 4/2004 |
| WO | WO03087616 A1 | 10/2003 |
| WO | WO2008104325 A1 | 9/2008 |

OTHER PUBLICATIONS

International Preliminary Report on Patentability dated Jun. 5, 2014, 7 pages.

International Search Report and Written Opinion for PCT/EP2012/073222 dated Nov. 21, 2012, 10 pages.

Chinese Office Action dated Sep. 29, 2015, 7 pages.

English Translation of Chinese Office Action dated Sep. 29, 2015, 11 pages.

\* cited by examiner

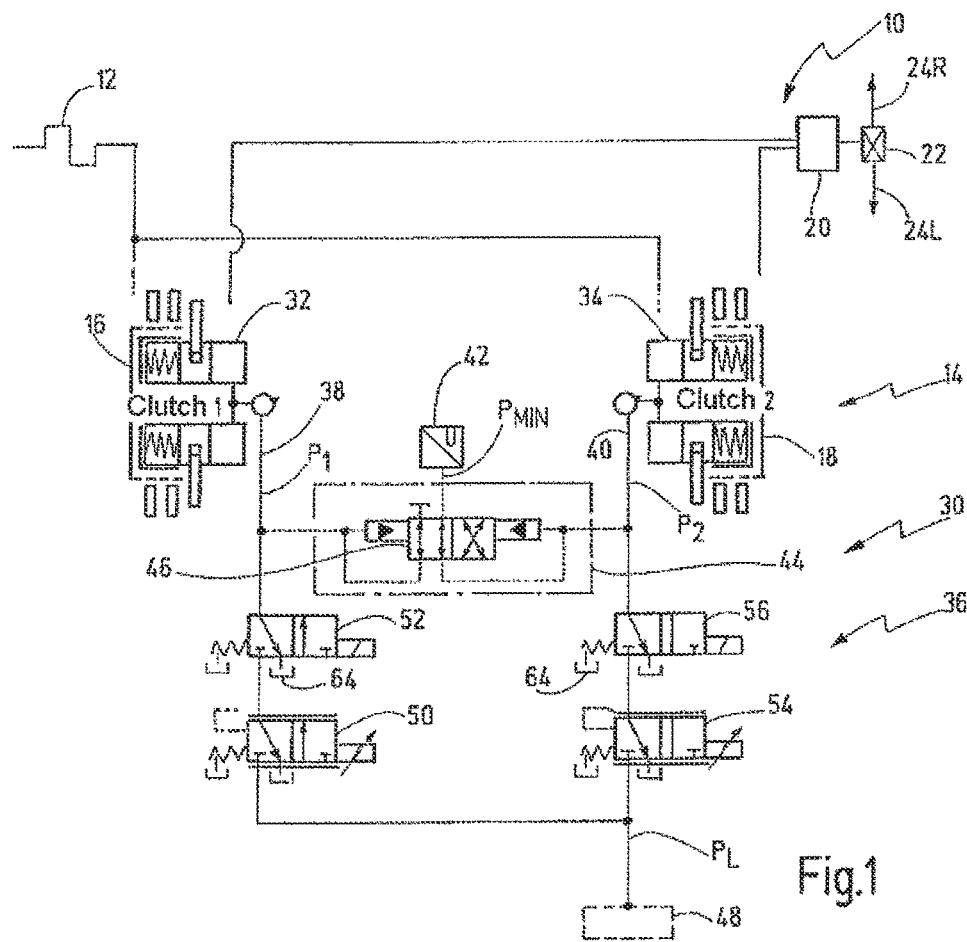
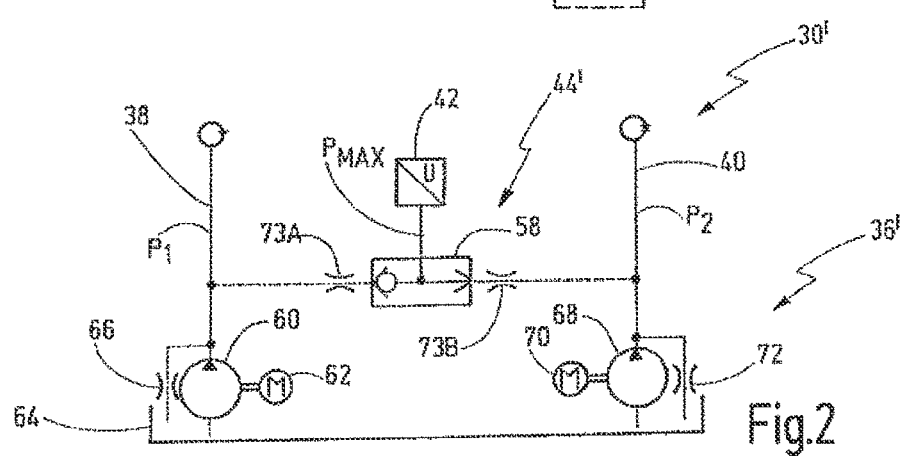

ACTUATOR ARRANGEMENT FOR A MOTOR VEHICLE DRIVETRAIN, WITH CONTROL METHOD FOR THE SAME

CROSS REFERENCES TO RELATED APPLICATIONS

This is a Continuation application of International patent application PCT/EP 2012/073222, filed Nov. 21, 2012 which claims the priority of German patent application DE 10 2011 119 631.9, filed Nov. 22, 2011.

BACKGROUND OF THE INVENTION

The present invention relates to an actuator arrangement for a motor vehicle drivetrain, in particular for a dual-clutch arrangement, having a first fluid cylinder which is connected via a first fluid connection to a fluid supply device, having a second fluid cylinder which is connected via a second fluid connection to the fluid supply device, and having a pressure measuring arrangement, and to a method for the control of a dual-clutch arrangement by means of an actuator arrangement of said type.

Actuator arrangements of said type are known for the actuation of dual-clutch arrangements of dual-clutch transmissions for motor vehicles. Such dual-clutch arrangements have a first and a second friction clutch that can be actuated independently of one another. For this purpose, the fluid supply device generally has a first pressure regulating valve for regulating the pressure in the first fluid connection, and a second pressure regulating valve for regulating the pressure in the second fluid connection. The pressure regulating valves are commonly connected to a line pressure which is generated for example by means of a pump in combination with a line pressure regulating valve or in conjunction with a pressure accumulator.

The pressure in the fluid connections corresponds to the respective pressure in cylinder chambers of the fluid cylinder. The pressure thus corresponds to an actuating force for the actuation of the respective friction clutch and/or to a torque that can be transmitted by the friction clutch.

The friction clutches may be implemented as dry-running friction clutches of the classic type or as wet-running multiplate clutches.

In the case of dual-clutch transmissions, the friction clutches are actuated in overlapping fashion in order to transfer the power flow from one sub-transmission (for example for the odd-numbered gear stages) to a second sub-transmission (for example for the even-numbered gear stages), specifically without an interruption in traction power. In this way, it is possible to perform gear changes without an interruption in traction power.

For the overlapping actuation of the two friction clutches, it is advantageous if the actuating pressure or the torque transmitted by the friction clutches can be adjusted, preferably regulated, in a precise manner.

For this purpose, it is known for the first fluid connection to be assigned a first pressure sensor and for the second fluid connection to be assigned a second pressure sensor. Here, the two pressure sensors form a pressure measuring arrangement.

The pressure sensors determine respective actual pressures, which are compared in an electronic regulator with respective target pressures, wherein the regulating error thus formed is used for the control of the respective pressure regulating valve.

SUMMARY OF THE INVENTION

Against this background, it is an object of the invention to specify an improved, in particular cheaper actuator arrangement and an associated control method.

Said object is achieved, in the case of the actuator arrangement mentioned in the introduction, in that the pressure measuring arrangement has a single pressure sensor which is connected by means of a connecting arrangement to the first fluid connection and to the second fluid connection. The object is also achieved by means of a method for the control of a dual-clutch arrangement by means of an actuator arrangement of said type.

By means of said measure, it is possible for the actuator arrangement to be realized with only a single pressure sensor, such that the actuator arrangement can be constructed at considerably lower cost.

By means of a connecting arrangement of said type, it is furthermore possible to implement functionality which, in terms of regulation quality and functional reliability, is not significantly inferior to a solution with one pressure sensor for each friction clutch. This is because, in the vast majority of operating situations, high regulation quality is required only for one of the two clutches.

Furthermore, for further functions, such as for example the adaptation of the clutch pressure characteristic curves, for kiss point adaptation or for monitoring with regard to the protection objective of preventing inadmissible pressurization of both clutches, it is generally likewise the case that only the measurement of one clutch pressure is necessary.

It is possible here, for example, for the pressure of the inactive clutch, that is to say of the clutch which is pressurized to a lesser extent, to be detected.

The object is thus achieved in its entirety.

In one particularly preferred embodiment, the connecting arrangement has a valve arrangement.

By means of a valve arrangement, it is possible for the single pressure sensor to be connected either to the first fluid connection or to the second fluid connection. It can be ensured in this way that the pressure sensor is used in each case for detecting the pressure in one of the fluid connections.

By means of a valve arrangement, it is however also possible to realize further functions of the fluid pressures in the fluid connections.

In general, it is possible here for the valve arrangement to be actuated, for example electromagnetically, by means of a superordinate regulating or control arrangement.

It is however particularly preferable for the valve arrangement to be fluid-actuated.

In this way, the actuation of the valve arrangement can be realized on the basis of the pressures prevailing in the fluid connections, such that no complex control or regulating device is required.

Here, in one embodiment, the valve arrangement is connected to the first and second fluid connections and to the pressure sensor such that the pressure sensor detects the minimum pressure out of the fluid pressures prevailing in the fluid connections.

The minimum pressure should be understood in each case to mean the lower out of the fluid pressures in the fluid connections. In the case of a dual-clutch transmission, this is generally the fluid pressure in the fluid connection assigned to the presently inactive friction clutch. In one preferred embodiment, the single pressure sensor thus detects a minimum pressure, said detected minimum pressure being used for calibration of the presently inactive friction clutch. In this embodiment, the regulation of the active friction clutch is performed not by means of the presently detected minimum pressure in a fluid connection but rather by means of a predictive model in which regulation is performed using target and actual values of the dual-clutch transmission such as load torque, friction coefficient, rotational speed difference, etc.

In a further embodiment, the valve arrangement is connected to the first and second fluid connections and to the pressure sensor such that the pressure sensor detects the maximum pressure out of the fluid pressures prevailing in the fluid connections.

The maximum pressure is to be understood in each case to mean the higher of the two pressures in the fluid connections.

Furthermore, in a further embodiment, the valve arrangement is connected to the first and second fluid connections and to the pressure sensor such that the pressure sensor detects the pressure difference between the fluid pressures prevailing in the fluid connections.

In a further preferred embodiment, the connecting arrangement is connected to the first and second fluid connections and to the pressure sensor and is designed such that the pressure sensor detects a mean pressure from the fluid pressures prevailing in the fluid connections.

In this embodiment, the connecting arrangement may also be formed without a valve. The connecting arrangement may for example have orifices that connect the fluid connections to the single pressure sensor.

The mean pressure may be a basic mean pressure representing the mean of the two fluid pressures. The mean pressure may however also be a weighted mean pressure.

In general, it is possible for each of the above-described embodiments to be realized individually in an actuator arrangement for a motor vehicle drivetrain, wherein the embodiment is selected on the basis of the demands for protection objectives, regulating accuracy etc.

In one preferred embodiment, however, the connecting arrangement is switchable between at least two states, wherein, in one state, the pressure sensor detects a minimum pressure, a maximum pressure, a pressure difference or a mean pressure, and wherein, in the other state, the pressure sensor detects another pressure out of minimum pressure, maximum pressure, pressure difference and mean pressure.

In this embodiment, at least two valve arrangements or connecting arrangements of the above-described type are combined with one another such that a different valve arrangement or connecting arrangement can be connected to the pressure sensor depending on the operating situation.

It is particularly preferable if a fluid-control switching device switches the connecting arrangement between the two states.

In this way, it is possible for the "correct" fluid pressure in each case to be measured without intervention by a control or regulating device.

For example, it may conceivably be provided that, above a fluid pressure threshold (of for example 1 bar), a minimum pressure is detected, and below said fluid pressure threshold, a maximum pressure is detected.

It is also possible for the connecting arrangement to be equipped with at least one timing element which is connected such that the switching between the states is influenced by the timing element.

In this way, it is possible to dispense with the provision of a complex sequence controller.

Overall, it is also advantageous if the fluid supply device has at least one safety valve which is coupled to one of the fluid connections and which can be triggered in order to reduce the pressure in said fluid connection (preferably abruptly in order to open the associated friction clutch quickly), wherein the safety valve is connected to the connecting arrangement such that, when the safety valve is triggered, the pressure sensor detects the fluid pressure prevailing in the other fluid connection.

It can be achieved in this way that, for example in the event of a reset, upon which the safety valve of one friction clutch is triggered in order to open said friction clutch as quickly as possible, it is ensured that, for the time of the reset (or for the time of a subsequent fault), it is at least temporarily possible for the fluid pressure in the other fluid connection to be measured.

In a further preferred embodiment, the fluid supply device and the connecting arrangement are connected to one another by means of a coupling device such that the pressure sensor can be connected directly to a pressure regulating valve of the fluid supply device.

By means of the coupling device, which may be formed for example by means of an arrangement of check valves, it is possible, with suitable control of the fluid supply device, for the pressure sensor to be connected directly to the outlet of one of the pressure regulating valves in order thereby to be able to perform a clutch calibration or a clutch characteristic curve adjustment or a biting point adaptation.

In the above embodiments, it is self-evident that the connecting arrangement may be switchable between two or more states.

It is also self-evident that, in a preferred embodiment, each of the two fluid connections is assigned a safety valve.

Finally, it is self-evident that the fluid supply device may be realized in a variety of ways, for example in classic form by means of a regulated pressure source which generates a line pressure from which the respective fluid pressures in the fluid lines are derived (by means of respective pressure regulating valves). It is alternatively also possible for the fluid connections to be connected in each case to a pressure port of an electric-motor-driven pump, wherein the pressure in the fluid line is then set by adjustment of the rotational speed of the respective electric motor.

It is self-evident that the features mentioned above and the features yet to be explained below may be used not only in the respectively specified combination but also in other combinations or individually without departing from the scope of the present invention.

BRIEF DESCRIPTION OF THE DRAWINGS

Exemplary embodiments of the invention are represented in the drawings and are explained in more detail in the following description. In the drawings:

FIG. 1 is a schematic illustration of a motor vehicle drivetrain with an embodiment of an actuator arrangement according to the invention;

FIG. 2 is a schematic illustration of a further embodiment of an actuator arrangement according to the invention;

DESCRIPTION OF PREFERRED EMBODIMENTS

Figure 3:
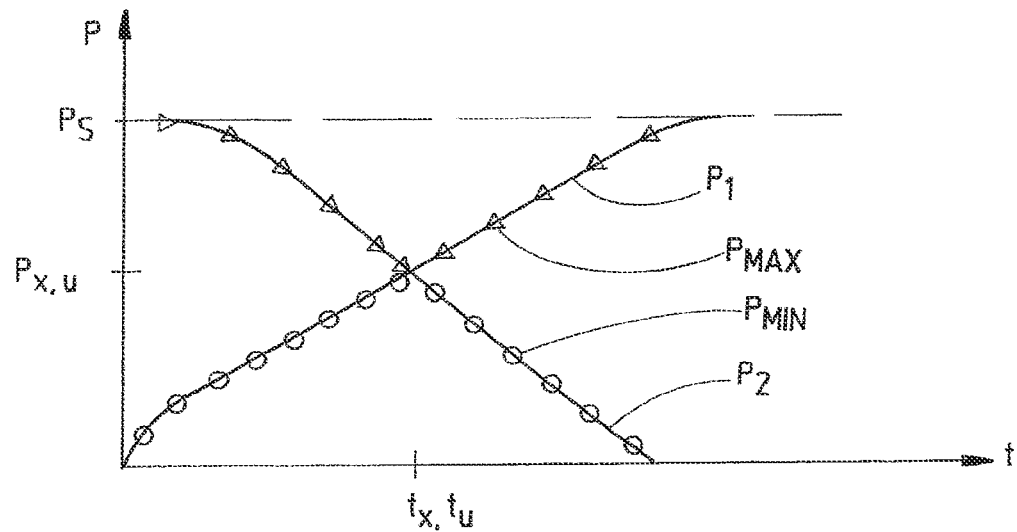
FIG. 3 shows a diagram of pressure versus time during an overlapping shift process.

In FIG. 1, a drivetrain for a motor vehicle is schematically illustrated and is denoted as a whole by 10.

The drivetrain 10 has a drive engine 12, the output of which is connected to an input element of a dual-clutch arrangement 14. The dual-clutch arrangement 14 has a first friction clutch 16 and a second friction clutch 18 (dry friction clutch or a wet-running multiplate clutch). Output elements of the two friction clutches 16, 18 are connected to a transmission 20 which has two sub-transmissions and which is in the form of a dual-clutch transmission. An output of the transmission 20 is connected to a differential 22, by means of which drive power is distributed to two driven wheels 24L, 24R of the motor vehicle.

An actuator arrangement 30 is provided for the actuation of the dual-clutch arrangement 14. The actuator arrangement 30 has a first fluid cylinder 32, the piston of which acts on the first friction clutch 16. Furthermore, the actuator arrangement 30 has a second fluid cylinder 34, the piston of which acts on the second friction clutch 18. The friction clutches 16, 18 are preferably normally-open friction clutches which are preloaded into an open position by means of a spring arrangement schematically indicated in FIG. 1.

Furthermore, the actuator arrangement 30 comprises a fluid supply device 36. The first fluid cylinder 32 is connected to the fluid supply device 36 via a first fluid connection 38. The second fluid cylinder 34 is connected to the fluid supply device 36 via a second fluid connection 40.

By means of the fluid supply device 36, a first pressure $P_1$ is generated in the first fluid connection 38. Furthermore, by means of the fluid supply device 36, a second fluid pressure $P_2$ is generated in the second fluid connection 40

The actuator arrangement 30 also has a single pressure sensor 42, which detects a pressure in a fluid line and converts said pressure into a voltage or some other electrical variable that can be used for regulation purposes.

The single pressure sensor 42 is connected by means of a connecting arrangement 44 both to the first fluid connection 38 and also to the second fluid connection 40.

In the embodiment of FIG. 1, the connecting arrangement 44 comprises a valve 46 which connects the pressure sensor 42 to that fluid connection 38, 40 in which the lower pressure prevails ($P_{MIN}$). In the present case, said valve is realized by means of a 4/2 directional valve which is fluid-actuated on both sides. The pressure $P_1$ acts in one switching direction, and the pressure $P_2$ acts in the other switching direction. If the pressure $P_2$ is for example greater than $P_1$, the directional valve 46 is displaced to the left in FIG. 1, such that the first fluid connection 38 (with the pressure $P_1$) is connected to the pressure sensor 42, whereas the second fluid connection 40 is separated from the pressure sensor 42. If the pressure $P_1$ is greater than $P_2$, the valve is displaced to the right, such that the second fluid connection 40 is connected to the pressure sensor 42 and the first fluid connection 38 is separated from the pressure sensor 42.

It is achieved in this way that the pressure sensor detects the minimum pressure $P_{MIN}$ out of the fluid pressures $P_1$, $P_2$ prevailing in the fluid connections.

In the embodiment of FIG. 1, the fluid supply device 36 has a regulated pressure source 48 which provides a line pressure $P_L$. Furthermore, the fluid supply device 36 has a first pressure reduction valve 50, which is in the form of a proportional valve, and a first safety valve 52, which is in the form of a basic directional valve. The first fluid connection 38 is connected to the line pressure $P_L$ via the first safety valve 52 and the first pressure reduction valve 50.

Correspondingly, the fluid supply device 36 has a second pressure reduction valve 54 and a second safety valve 56. The second fluid connection 40 is connected to the line pressure $P_L$ via the second safety valve 56 and the second pressure reduction valve 54.

The first pressure reduction valve 50 regulates the first fluid pressure $P_1$. The second pressure reduction valve 54 regulates the second fluid pressure $P_2$. In the event of a reset, it is possible for the first and/or the second safety valve 52, 56 to be triggered such that the respectively associated fluid connection 38, 40 is connected to a tank 64. For this purpose, the safety valves 52, 56 may for example be configured such that, in a main position (shown in FIG. 1), they connect the fluid connections 38, 40 respectively to the tank. A connection between the respective pressure reduction valve 50, 54 and the associated fluid connection 38, 40 is first established when the associated safety valve 52, 56 is electrically energized.

By means of the safety valves, it can be ensured that, in the event of a reset (drop-out of the supply voltage), the clutches 16, 18 are immediately switched into an unpressurized state and open. It is alternatively also possible for a reset to involve only one of the clutches 16, 18.

FIG. 2 shows an alternative embodiment of an actuator arrangement 30'. The latter generally corresponds in terms of construction and mode of operation to the actuator arrangement 30 of FIG. 1. Therefore, identical elements are denoted by the same reference signs. Substantially the differences will be explained below.

In the case of the actuator arrangement 30', the connecting arrangement 44' has a shuttle valve 58, the center tap of which is connected to the pressure sensor 42, and the ports of which are connected to the first and second fluid connections 38, 40 respectively. By means of the shuttle valve 58, it is achieved that the pressure sensor 42 is connected in each case to that fluid connection 38, 40 in which the higher pressure prevails. Consequently, the pressure sensor 42 detects the maximum pressure $P_{MAX}$ out of the fluid pressures $P_1$, $P_2$ prevailing in the fluid connections 38, 40.

Furthermore, the actuator arrangement 30' comprises an alternative embodiment of a fluid supply device 36'. The fluid supply device 36' has a first pump 60 that can be driven by means of a first electric motor 62. A pressure port of the first pump 60 is connected to the first fluid connection 38. An intake port of the first pump 60 is connected to a tank. Furthermore, the pressure port of the first pump 60 is connected to the tank via a first aperture 66. The pressure $P_1$ in the first fluid connection 38 is set through adjustment of the rotational speed of the first electric motor 62.

Correspondingly, for setting the pressure $P_2$ in the second fluid connection 40, the fluid supply device 36' has a second pump 68 that can be driven by means of a second electric motor 70. The pressure port of the second pump 68 is connected to the second fluid connection 40. The intake port of the second pump 68 is connected to the tank 64. Furthermore, the pressure port of the second pump 68 is connected to the tank via a second orifice 72.

The regulation characteristic and/or the response characteristic of the fluid supply device 36' can be improved through the provision of the orifices 66, 72.

Also illustrated in FIG. 2 is a delay device which, in the present case, is realized by means of two hydraulic orifices 73A, 73B. The orifices 73A, 73B are provided between the ports of the connecting arrangement 44' and the fluid connections 38, 40. Said delay device may optionally be used if the time at which the pressure measurement is switched from the pressure in one fluid connection to the pressure in the other fluid connection should occur after a time delay, that is to say should not coincide with the time at which the pressures $P_1$, $P_2$ are identical.

The two orifices 73A, 73B may also be used in the embodiment of FIG. 1, in this case preferably directly upstream of the hydraulic control inlets of the directional valve 46.

For the explanation of the mode of operation of said delay device in the form of the two orifices 73A, 73B, FIG. 3 firstly illustrates the profile with respect to time of the pressure measurement during an overlapping clutch actuation in a situation in which such a delay device is not provided. It can be seen that the pressure $P_1$ increases over time and the pressure $P_2$ decreases over time. At a time $t_x$, the pressures are identical, corresponding to a handover pressure $P_x$.

Furthermore, FIG. 3 shows the pressure $P_{MIN}$ that is measured in the embodiment of FIG. 1. It can be seen that, the pressure $P_1$ is measured up to the time $t_x$, and the pressure $P_2$ is measured after the time $t_x$. Correspondingly, in the embodiment of FIG. 2, the pressure $P_{MAX}$ may be measured, that is to say the pressure $P_2$ is measured up to the time $t_x$, and the pressure $P_1$ is measured after the time $t_x$. The time $t_x$ corresponds in this case to a switching time $t_U$ of the connecting arrangement or of the valves 46, 58.

Figure 4:
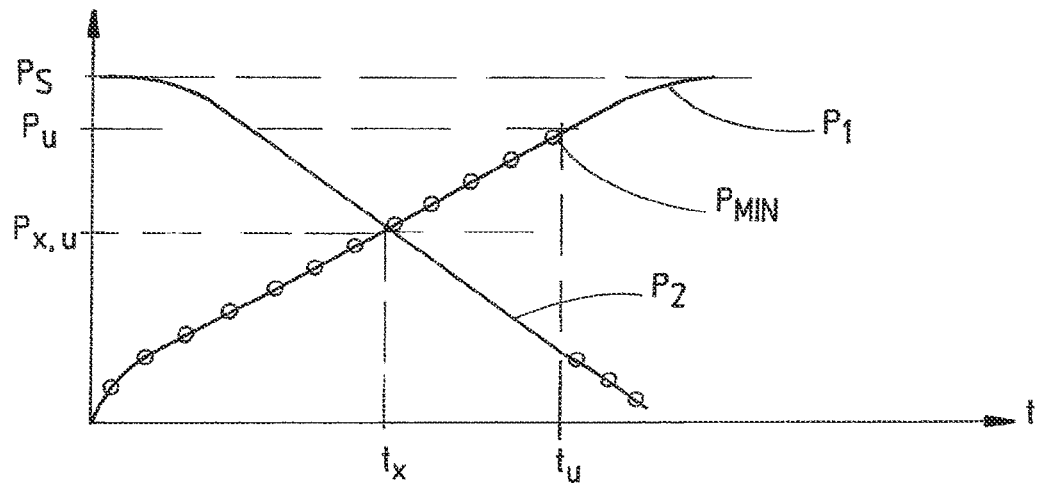
FIG. 4 shows a diagram corresponding to FIG. 3 with the use of a delay device.

FIG. 4 illustrates a corresponding profile of the pressures $P_1$, $P_2$. In this embodiment, it is again the case that the minimum pressure $P_{MIN}$ is measured by the pressure sensor 42, wherein it is however the case that a delay device in the form of the two orifices 73A, 73B is provided. The respectively active orifice 73A, 73B causes the switchover of the valve 46 to be slowed, such that the valve first switches at a later time $t_U$, which does not coincide with the time $t_x$ of pressure identity.

It can advantageously be achieved in this way that the regulation of the shift process takes place over the entire time of the overlap at a clutch, for example the closing clutch. It is advantageously the case during said shift process that the single pressure sensor is connected by means of the connecting arrangement to the fluid connection of the closing clutch, because it is during the closing of the clutch that significantly greater demands are made on regulation quality. At least for as long as the opening clutch is not engaged, the closing clutch transmits a higher clutch torque. The dual-clutch arrangement is configured with a positive friction coefficient profile versus slip, wherein, with decreasing rotational speed, the friction coefficient and thus also the clutch torque decrease. If it is however now the case owing to wear, mechanical tolerances, settling of the clutch springs, etc., that such a positive friction coefficient profile of the closing clutch no longer exists, and instead for example a negative friction coefficient profile is encountered, said negative friction coefficient profile must be corrected through active regulation. In another design variant, this may also be the opening clutch.

Said embodiment is suitable for example for vehicle types which operate with high power demands and which accordingly require high clutch pressures.

The fluid supply device 36' of FIG. 2 may also be used in the embodiment of FIG. 1. Furthermore, the fluid supply device 36 of FIG. 1 or the fluid supply device 36' of FIG. 2 may each alternatively also be used in the following embodiments.

Figure 5:
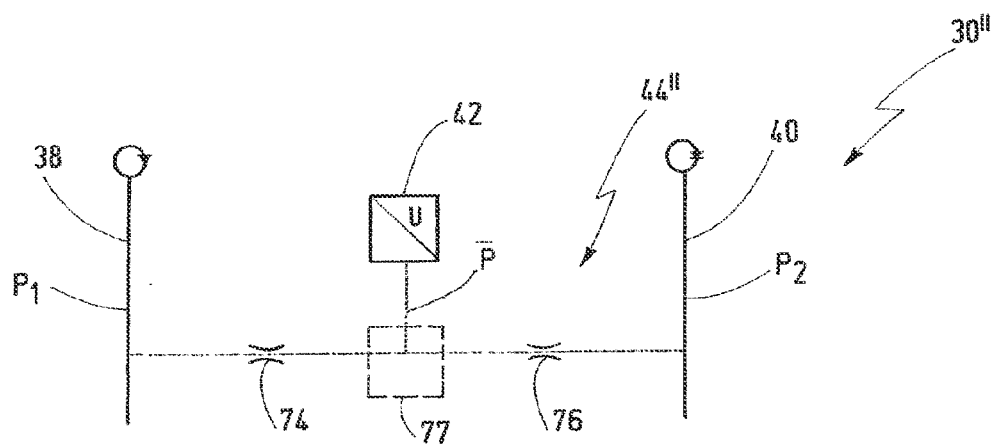
FIG. 5 is a schematic illustration of a further embodiment of an actuator arrangement according to the invention.

FIG. 5 shows a part of a further embodiment of an actuator arrangement 30''. In the actuator arrangement 30'', the connecting arrangement 44'' has a first connecting orifice 74 which connects the first fluid connection 38 to the pressure sensor 42. Furthermore, the connecting arrangement 44'' has a second connecting orifice 76 which connects the second fluid connection 40 to the pressure sensor 42.

In this embodiment, the pressure sensor 42 determines a mean pressure that may be defined by a basic or a weighted mean value (depending on the size of the connecting orifices 74, 76). In this embodiment, the pressure sensor 42 consequently detects a mean pressure P from the fluid pressures $P_1$, $P_2$ prevailing in the fluid connections 38, 40.

It is self-evident that, instead of the maximum pressure $P_{MAX}$, the minimum pressure $P_{MIN}$ or the mean pressure $\overline{P}$, a connecting arrangement 44 may also provide a pressure difference between the two fluid pressures $P_1$, $P_2$, even though this is not illustrated in any more detail in the figures.

It is also self-evident that the three actuator arrangements 30, 30', 30'' of FIGS. 1 to 3 may also be combined with one another.

For this purpose, a switching device 77 may be provided which connects the different connecting arrangements 44, 44', 44'' alternatively to the pressure sensor 42, such that the overall connecting arrangement can be switched between at least two states.

It is also self-evident that a timing element may also be integrated into the connecting arrangement, which timing element is connected such that the switching between the states is influenced by the timing element.

Figure 6:
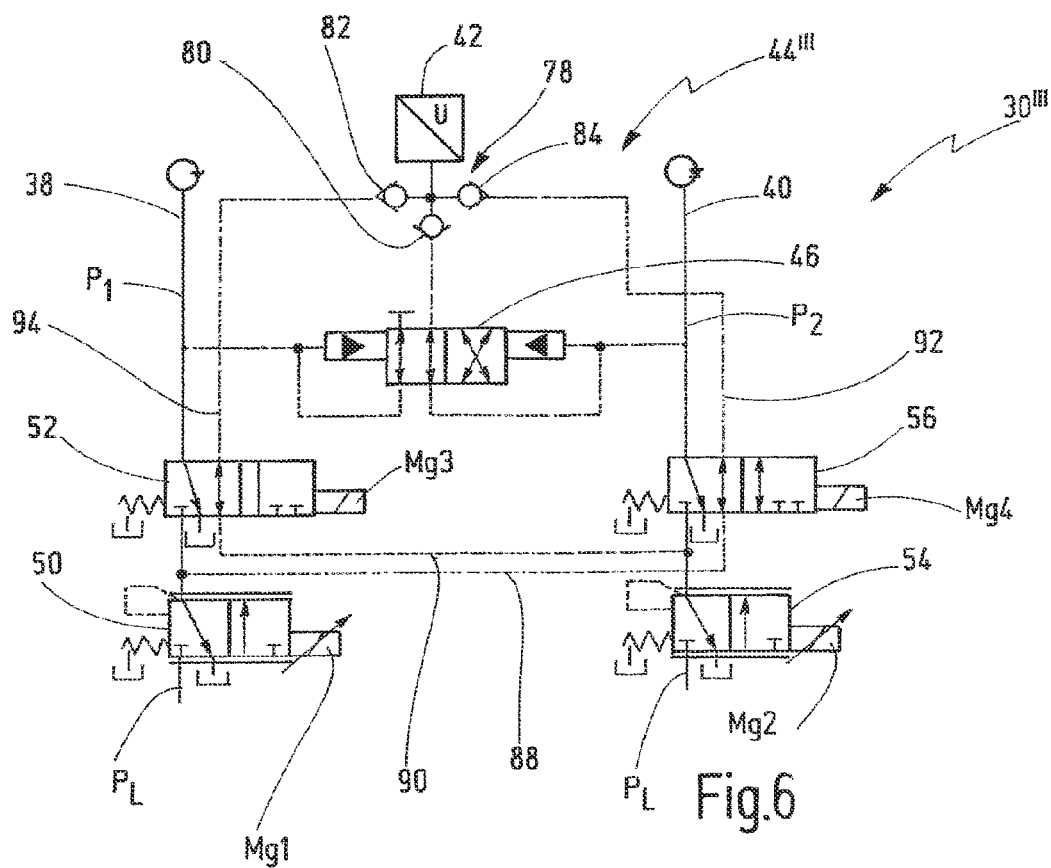
FIG. 6 is a schematic illustration of a further embodiment of an actuator arrangement according to the invention.

FIG. 6 shows a further embodiment of an actuator arrangement 30'''. Said actuator arrangement generally corresponds in terms of construction and mode of operation to the actuator arrangement 30 of FIG. 1. Identical elements are therefore denoted by the same reference signs. Substantially the differences will be explained below.

In the case of the actuator arrangement 30''', in the connecting arrangement 44''', a coupling device 78 is provided in addition to the 4-2 directional valve 46. In the present case, the coupling device 78 serves in particular for generating a state in which a clutch adjustment or biting point adjustment can be performed. In particular, the coupling device 78 serves to realize a situation in which the pressure sensor 42 directly measures the pressure generated by a respective pressure reduction valve 50, 54, for example for the purpose of performing a biting point adaptation. In the present case, the coupling device 78 has three check valves 80, 82, 84. A first check valve 80 connects the valve 46 to the pressure sensor 42. A second check valve 82 connects the first safety valve 52 to the pressure sensor 42 via a line 94. A third check valve 84 connects the second safety valve 56 to the pressure sensor 42 via a line 92. Furthermore, the first safety valve 52 has an inlet which is connected via a line 90 to the outlet of the second pressure reduction valve 54, and the second safety valve 56 has an inlet which is connected via a line 88 to the outlet of the first pressure reduction valve 50.

During normal operation, the coupling device 78 is substantially without function, because the safety valves 52, 56 are both energized by means of respective magnets Mg3, Mg4, such that the lines 92, 94 are substantially unpressurized (at most, a low back pressure prevails). The pressure prevailing at the first check valve 80 is in any case higher than the pressures in the lines 92, 94, such that the pressure sensor 42 is connected to the directional valve 46, and consequently to the lower of the two pressures $P_1$, $P_2$. The two check valves 82, 84 are in this case closed. The coupling device 78 is activated in order to adapt a clutch position or a biting point of in each case one of the two clutches 16, 18 or in order to adjust the clutch characteristic curve. This will be described below on the basis of an adjustment process for the first friction clutch 16. The described process may however be applied in the same way to the second friction clutch.

Firstly, the magnet Mg2 of the second pressure reduction valve 54 is substantially retracted, and the magnet Mg4 of the second safety valve 56 is fully deactivated (is electrically deenergized). By contrast, the first safety valve 52 is fully opened by means of the magnet Mg3, and the magnet Mg1 of the first pressure reduction valve 50 is substantially deployed.

In this way, a pressure of 3 bar prevails for example at the outlet of the pressure reduction valve 50, whereas the pressure at the second friction clutch 18 falls for example to 0.5 bar.

Owing to this pressure difference, the valve 46 switches to the throughflow configuration illustrated on the left-hand side in FIG. 6 (as illustrated in FIG. 6), and the lower of said two pressures prevails at the first check valve 80. On the other hand, the third check valve 84 is connected directly to the outlet of the pressure reduction valve 50 via the line 92 and the line 90, such that the exemplary pressure of 3 bar prevails there. Owing to the opening of the first safety valve 52, it is likewise the case that only an internal back pressure, which is for example lower than 0.5 bar, for example 0.2 bar, prevails at the second check valve 82.

Accordingly, in this case, the third check valve 84 is switched into a pass-through position, and the other check valves 80, 82 are blocked. Accordingly, the pressure sensor 42 is connected directly to the outlet of the first pressure reduction valve 50.

If one were now to slightly vary the control variable of the magnet Mg1, more hydraulic fluid flows into the first fluid connection 38. Accordingly, the pressure measured at the pressure sensor 42, as a measure of the clutch pressure in the first clutch 16, also changes. Accordingly, in this setting, the first clutch 16 can be adjusted, and in particular, the biting point thereof can be adapted.

This may also be performed correspondingly for the second clutch 18 by virtue of the actuation of each of the valves 50 to 56 being reversed.

The invention claimed is:

1. An actuator arrangement for a motor vehicle drivetrain, having a first fluid cylinder which is connected via a first fluid connection to a fluid supply device, having a second fluid cylinder which is connected via a second fluid connection to the fluid supply device, and having a pressure measuring arrangement;
wherein the pressure measuring arrangement has a single pressure sensor which is connected by means of a connecting arrangement to the first fluid connection and to the second fluid connection, wherein the connecting arrangement has a valve arrangement, wherein the valve arrangement is connected to the first and second fluid connections and to the pressure sensor such that the pressure sensor detects the minimum pressure out of fluid pressures prevailing in the fluid connections, and wherein the valve arrangement is fluid-actuated.

2. The actuator arrangement as claimed in claim 1, wherein the minimum pressure is used for calibration of a presently inactive friction clutch of a dual-clutch arrangement.

3. The actuator arrangement as claimed in claim 1, wherein the connecting arrangement is switchable between at least two states, wherein, in one state, the pressure sensor detects a minimum pressure, a maximum pressure, a pressure difference or a mean pressure, and wherein, in the other state, the pressure sensor detects another pressure out of minimum pressure, maximum pressure, pressure difference and mean pressure.

4. The actuator arrangement as claimed in claim 3, wherein a fluid-controlled switching device switches the connecting arrangement between the at least two states.

5. The actuator arrangement as claimed in claim 3, wherein the connecting arrangement has at least one delay device which is connected such that the switching between the states or of the connecting arrangement is influenced by the device.

6. The actuator arrangement as claimed in claim 1, wherein the fluid supply device has at least one safety valve which is coupled to one of the fluid connections and which can be triggered in order to reduce the pressure in said fluid connection, wherein the safety valve is connected to the connecting arrangement such that, when the safety valve is triggered, the pressure sensor detects the fluid pressure prevailing in the other fluid connection.

7. The actuator arrangement as claimed in claim 1, wherein the fluid supply device and the connecting arrangement are connected to one another by means of a coupling device such that the pressure sensor can be connected directly to a pressure regulating valve of the fluid supply device.

8. The actuator arrangement as claimed in claim 1, wherein during a switching process, the pressure sensor is connected by means of the connecting arrangement to the fluid connection of a closing friction clutch of a dual-clutch arrangement.

9. A dual clutch arrangement, having a first clutch, a second clutch and an actuator arrangement, the actuator arrangement having a first fluid cylinder which is adapted to actuate the first clutch and is connected via a first fluid connection to a fluid supply device, having a second fluid cylinder which is adapted to actuate the second clutch and is connected via a second fluid connection to the fluid supply device, and having a pressure measuring arrangement;
wherein the pressure measuring arrangement has a single pressure sensor which is connected by means of a valve arrangement to the first fluid connection and to the second fluid connection, and which the single pressure sensor detects the minimum pressure out of fluid pressures prevailing in the fluid connections, and wherein the valve arrangement is fluid-actuated.

10. A method for the control of a dual-clutch arrangement by means of an actuator arrangement, the dual clutch arrangement having a first clutch and a second clutch, and the actuator arrangement having a first fluid cylinder which is adapted to actuate the first clutch and is connected via a first fluid connection to a fluid supply device, having a second fluid cylinder which is adapted to actuate the second clutch and is connected via a second fluid connection to the fluid supply device, and having a pressure measuring arrangement;
wherein the pressure measuring arrangement has a single pressure sensor which is connected by means of a valve arrangement to the first fluid connection and to the second fluid connection, wherein the method includes the step of detecting the minimum pressure out of the fluid pressures in the fluid connections, and wherein the valve arrangement is fluid-actuated.

11. The method as claimed in claim 10, wherein the minimum pressure is used for calibration of the presently inactive clutch of the dual clutch arrangement.

* * * * *

UNITED STATES PATENT AND TRADEMARK OFFICE
CERTIFICATE OF CORRECTION

PATENT NO. : 9,458,899 B2
APPLICATION NO. : 14/273634
DATED : October 4, 2016
INVENTOR(S) : Stefan Rothvoss et al.

Page 1 of 1

It is certified that error appears in the above-identified patent and that said Letters Patent is hereby corrected as shown below:

In the Claims

Claim 5, Column 10, Line 12, add -- delay -- before the word "device".

Signed and Sealed this
Ninth Day of May, 2017

Michelle K. Lee
*Director of the United States Patent and Trademark Office*